United States Patent
Abeta et al.

(10) Patent No.: US 8,391,146 B2
(45) Date of Patent: Mar. 5, 2013

(54) BASE STATION, MOBILE STATION, MOBILE COMMUNICATION SYSTEM, AND METHOD OF CONTROLLING CONTROL SIGNAL TRANSMISSION

(75) Inventors: Sadayuki Abeta, Yokohama (JP); Motohiro Tanno, Yokohama (JP); Nobuhiko Miki, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 665 days.

(21) Appl. No.: 11/909,673

(22) PCT Filed: Mar. 20, 2006

(86) PCT No.: PCT/JP2006/305514
§ 371 (c)(1),
(2), (4) Date: Dec. 9, 2008

(87) PCT Pub. No.: WO2006/109438
PCT Pub. Date: Oct. 19, 2006

(65) Prior Publication Data
US 2009/0207788 A1    Aug. 20, 2009

(30) Foreign Application Priority Data
Mar. 31, 2005  (JP) .................................. 2005-102872

(51) Int. Cl.
*H04L 1/00* (2006.01)
(52) U.S. Cl. ......... 370/235; 370/252; 370/338; 370/468
(58) Field of Classification Search .......... 370/230–235, 370/252, 253, 328–330, 338, 468; 455/450–453
See application file for complete search history.

(56) References Cited

U.S. PATENT DOCUMENTS

| | | | |
|---|---|---|---|
| 6,611,509 B1 | 8/2003 | Hayashi et al. | |
| 7,197,017 B1* | 3/2007 | Rezaiifar et al. | 370/338 |
| 2003/0064728 A1 | 4/2003 | Speight | |
| 2003/0095538 A1 | 5/2003 | Kayama et al. | |
| 2003/0097480 A1* | 5/2003 | Feuerstraeter et al. | 709/251 |
| 2004/0121780 A1* | 6/2004 | Nasshan | 455/455 |
| 2004/0184481 A1* | 9/2004 | Lee | 370/469 |
| 2005/0009527 A1 | 1/2005 | Sharma | |
| 2005/0143018 A1* | 6/2005 | Shinozaki | 455/76 |

(Continued)

FOREIGN PATENT DOCUMENTS

| | | |
|---|---|---|
| CN | 1233117 A | 10/1999 |
| EP | 1 587 337 A1 | 10/2005 |

(Continued)

OTHER PUBLICATIONS

3GPP TS 25.212 V6.4.0 (Mar. 2005), Technical Specification, 3rd Generation Partnership Project; Technical Specification Group Radio Access Network; Multiplexing and channel coding (FDD) (Release 6) (85 pages).

(Continued)

*Primary Examiner* — Pao Sinkantarakorn
(74) *Attorney, Agent, or Firm* — Osha Liang LLP (57) ABSTRACT

A disclosed base station includes a transmission-rate determining unit for determining a transmission rate of a control channel for transmitting an upper-layer control signal, and a transmitter for allocating a predetermined bandwidth to the control channel for transmitting the upper-layer control signal according to the determined transmission rate, and transmitting the signal.

5 Claims, 10 Drawing Sheets

U.S. PATENT DOCUMENTS

| | | | |
|---|---|---|---|
| 2009/0310588 A1* | 12/2009 | Padovani et al. | 370/342 |
| 2010/0067476 A1 | 3/2010 | Periyalwar et al. | |

FOREIGN PATENT DOCUMENTS

| | | |
|---|---|---|
| JP | 8-56380 | 2/1996 |
| JP | 09-055764 A | 2/1997 |
| JP | 9-289684 | 11/1997 |
| JP | 2002-135229 | 5/2002 |
| JP | 2003-521182 | 7/2003 |
| WO | 03103330 A1 | 12/2003 |
| WO | 2004/066661 A1 | 8/2004 |
| WO | 2005015940 A1 | 2/2005 |

OTHER PUBLICATIONS

3GPP TS 25.213 V6.2.0 (Mar. 2005), Technical Specification, 3rd Generation Partnership Project; Technical Specification Group Radio Access Network; Spreading and modulation (FDD) (Release 6) (34 pages).

International Search Report issued in PCT/JP2006/305514, mailed on May 23, 2006, with translation (5 pages).

Japanese Office Action for Application No. 2005-102872, mailed on Jul. 27, 2010 (5 pages).

Patent Abstracts of Japan for Japanese Publication No. 09-055764, publication date Feb. 25, 1997 (1 page).

English translation of JP 4226599, Supplied as translation for WO 2005/015940, Year: 2005.

English translation of JP 4315910, Supplied as translation for WO 2004/066661, Year: 2004.

Mexican Office Action for Application No. MX/a/2007/011893, mailed on Jul. 15, 2010 (6 pages).

Chinese Office Action for Application No. 200680014892.4, mailed on Jun. 16, 2011 (20 pages).

esp@cenet Patent Abstract for Chinese Publication No. 1233117, publication date Oct. 27, 1999. (1 page).

Extended European Search Report for European Application No. 06729482.7 dated Jun. 27, 2012 (11 pages).

Office Action for U.S. Appl. No. 12/879,843 mailed Nov. 9, 2012 (9 pages).

* cited by examiner

BASE STATION, MOBILE STATION, MOBILE COMMUNICATION SYSTEM, AND METHOD OF CONTROLLING CONTROL SIGNAL TRANSMISSION

BACKGROUND OF THE INVENTION

1. Field of the Invention

The present invention relates to a base station, a mobile station, a mobile communication system, and a method of controlling control signal transmission.

2. Description of the Related Art

In W-CDMA (Wideband-CDMA) and HSDPA (High-Speed Downlink Packet Access), an enhanced technology of W-CDMA, for example, a base station transmits to a mobile station a data information signal, and an upper-layer control signal (e.g., user information, user authentication, and a control signal for handover when a user moves from one cell to another).

In W-CDMA, in downlink, dedicated channels allocating a specific code to a certain user and a shared channel shared by all users are provided. A base station multiplexes transmission data of each channel in code domain (see e.g., Non-Patent Document 1). Specifically, a base station includes a Forward Access Channel (FACH) and a Broadcast Channel.

The FACH, a channel for multiplexing control information of each user on a time axis, is used mainly for exchanging an upper layer signal at the time of a call setup. This signal is mapped onto a Secondary Common Control Channel in physical layer. For example, the FACH is used in a Random Access Channel response. A Broadcast Channel is a channel for reporting broadcast information common to all users (e.g., system information, or cell information). These signals are mapped onto a Primary Common Control Channel.

Moreover, in W-CDMA, in an uplink channel, a base station uses a Random Access Channel. The Random Access Channel is a channel for transmitting upper-layer control information. The control information is mapped onto a Physical Random Channel.

On the other hand, in HSPDA, in a downlink, HS-SCCH (High Speed Shared Control Channel) and HS-PDSCH (High Speed Physical Downlink Shared Channel) are added to W-CDMA.

HS-SCCH conducts, in a Shared CH, Layers 1 and 2 signalling at the time of HS-PDSCH transmission for high-speed packet transmission. Information transmitted using this HS-SCCH, including user information and MCS (Modulation & Coding scheme Set), are code-multiplexed with a HS-PDSCH.

HS-DPCCH conducts, in a dedicated CH, Layers 1 and 2 signalling at the time of receiving HS-PDSCH for high-speed packet transmission. Information transmitted using this HS-DPCCH, an ARQ (Automatic Repeat Request) ACK/NACK and a CQI (Channel Quality Indicator), are code-multiplexed (see e.g., Non-Patent Document 1).

Non-Patent Document 1
3GPP TS 25.212
Non-Patent Document 2
3GPP TS 25.213

SUMMARY OF THE INVENTION

Problem(s) to be Solved by the Invention

However, the related art as described above has the following problems.

Figure 1:
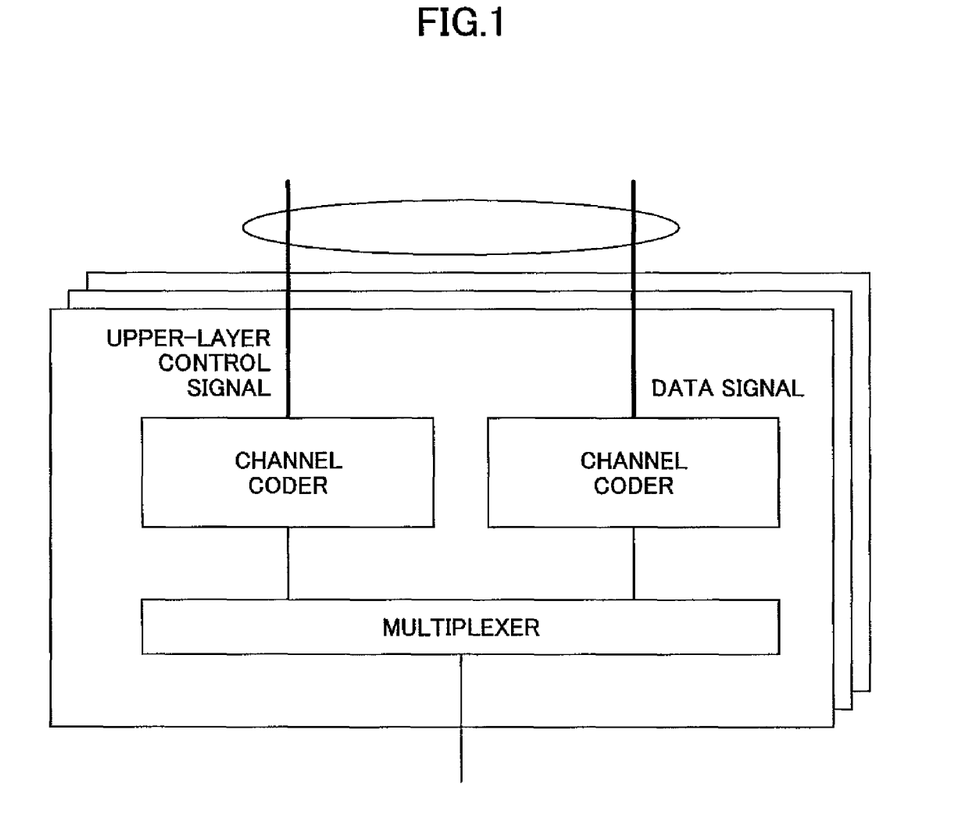
FIG. 1 illustrates a partial block diagram showing a base station.

There is a problem that a specific low rate control increases a control delay. For example, as shown in FIG. 1, an upper-layer control signal (e.g., a signal indicating an authentication in a case of a call setup and a report on a reception status in case of a handover) and a data signal are respectively input to corresponding channel encoders, then encoded data are fed into to a multiplexer. CRC addition, Rate Matching and channel coding are performed at the channel encoder.

The multiplexer multiplexes the encoded upper-layer control signal and encoded data signal. Then, multiplexed signals are fed into a control-channel specific physical or dedicated channel. In W-CDMA, since the transmission rate of specific control channel is approximately 3.4 kbps, large transmission delay occurs and a call set up, e.g., an authentication, or a call connection, takes time.

Figure 2:
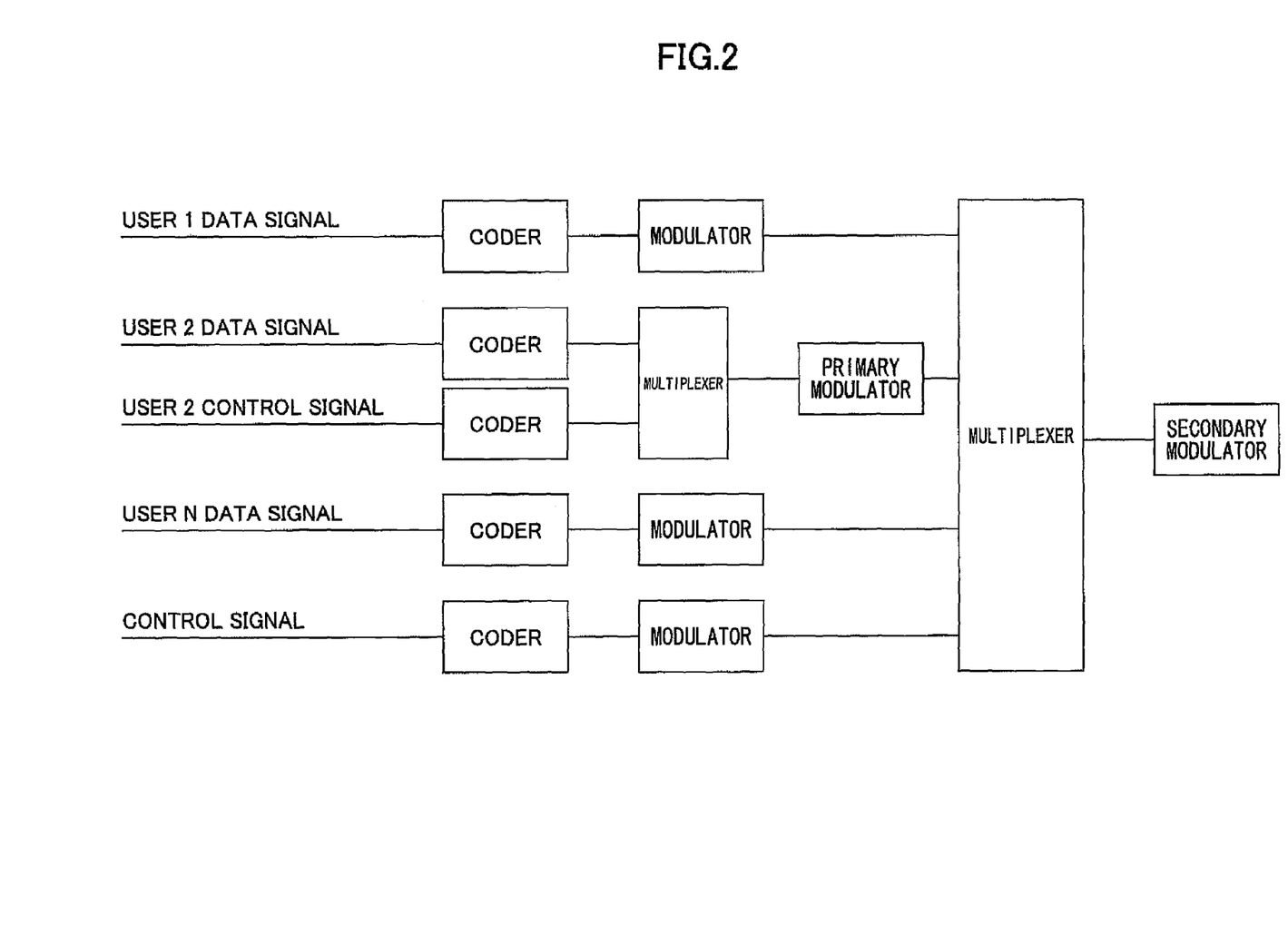
FIG. 2 illustrates another partial block diagram showing a base station.

In circuit-switching, numerous low-rate channels are used for transmitting voice and control signals. When there are signals destined for multiple users, a base station, as shown in FIG. 2, multiplexes (code-multiplexes) to control-specific channels signals destined for multiple users as shown for a user 1 data signal, a user N data signal, and a control signal, or multiplexes (code-multiplexes) with other signals after pre-multiplexing data and control signals as shown for user 2 data and control signals.

When packet switching is introduced, there is a requirement to satisfy the demand for transmitting when data are available, and connecting when desired with short latency.

It is a general object of the present invention to provide a base station, a mobile station, a mobile communication system, and a method of controlling control information transmission that makes it possible to reduce control signal transmission time.

Means for Solving the Problem

In order to solve at least one of the above-described problems, a base station in an embodiment of the present invention includes a transmission-rate determining unit for determining a transmission rate of a control channel for transmitting an upper-layer control signal, and a transmitter for allocating a predetermined bandwidth (e.g. number of sub-carriers (or resource blocks)) to the control channel for transmitting the upper-layer control signal according to the determined transmission rate.

The base station according to an embodiment of the present invention makes it possible to control the transmission rate for transmitting a control signal according to a traffic condition, or urgency (priority) of the control signal, for example.

A base station in another embodiment of the present invention includes an upper-layer control signal determining unit for determining whether a control signal transmitted from a mobile station indicates transmitting an upper-layer control signal, a channel-allocating unit for allocating a UL-SCH (Uplink Shared Channel) to the mobile station, and a reporting unit for transmitting an allocation-reporting packet for reporting that the UL-SCH has been allocated to the mobile station.

The base station according to another embodiment of the present invention makes it possible to allocate an UL-SCH to an upper-layer control signal transmitted by a mobile station.

Moreover, a base station in a further embodiment of the present invention includes an upper-layer control signal transmitter for multiplexing to a UL-SCH, upper-layer control signals to transmit a multiplexed signal.

The base station according to a further embodiment of the present invention makes it possible to transmit an upper-layer control signal using an UL-SCH normally used as a data CH.

Furthermore, in an embodiment of the present invention, in a mobile communication system including a mobile station and a base station, the base station includes a upper-layer control signal determining unit for determining whether a control signal transmitted from a mobile station indicates transmitting an upper-layer control signal, a channel-allocating unit for allocating a UL-SCH to the mobile station, and a reporting unit for transmitting an allocation-reporting packet for reporting that the UL-SCH has been allocated to the mobile station, and the mobile station includes a transmitter for transmitting a control signal for indicating transmitting an upper-layer control signal, a lower-layer control signal determining unit for determining whether an allocation-reporting packet transmitted from the base station is destined for the mobile station itself, and an upper-layer control signal transmitter for multiplexing upper-layer control signals to the UL-SCH to transmit a multiplexed upper-layer control signal.

The mobile station according to an embodiment of the present invention makes it possible to transmit an upper-layer control signal using a UL-SCH allocated to a base station.

A method of controlling control signal transmission in an embodiment of the present invention includes steps of: determining a transmission rate of a control channel for transmitting an upper-layer control signal, allocating a predetermined bandwidth to a control channel for transmitting the upper-layer control signal according to the determined transmission rate, and transmitting the upper-layer control signal to which the predetermined bandwidth is allocated.

The method of controlling control signal transmission according to an embodiment of the present invention makes it possible to control a transmission rate for transmitting a control signal according to a traffic condition, or urgency (priority) of a control signal, for example.

Moreover, a method of controlling control signal transmission in another embodiment of the present invention includes the steps of: transmitting a control signal indicating transmitting an upper-layer control signal, determining whether the transmitted control signal indicates transmitting the upper-layer control signal, allocating a UL-SCH based on the determining, transmitting an allocation-reporting packet for reporting that the UL-SCH has been allocated, determining whether the allocation-reporting packet is destined for a station itself, and multiplexing to the UL-SCH, upper-layer control signals to transmit a multiplexed signal based on the determining of whether the allocation-reporting packet is destined for the station itself.

The mobile station according to an embodiment of the present invention makes it possible to allocate a UL-SCH (Uplink Shared Channel) to an upper-layer control signal transmitted by a mobile station.

Advantage of the Invention

According to at least one of the embodiments of the present invention, a base station, a mobile station, a mobile communication system, and a method of controlling control information transmission may be realized which make it possible to reduce transmission time of a control signal.

DESCRIPTION OF THE PREFERRED EMBODIMENTS

Description of Notations

100 Base station
200 Mobile station

Best Mode of Carrying Out the Invention

Preferred embodiments of the present invention are described with reference to the drawings.

Throughout the drawings for explaining the embodiments, the same letters are used for those parts having the same functions, facilitating avoiding repetitive explanation.

A mobile communication system according to an embodiment of the present invention includes a base station 100, and a mobile station 200 which can wirelessly communicate with the base station 100.

Figure 3:
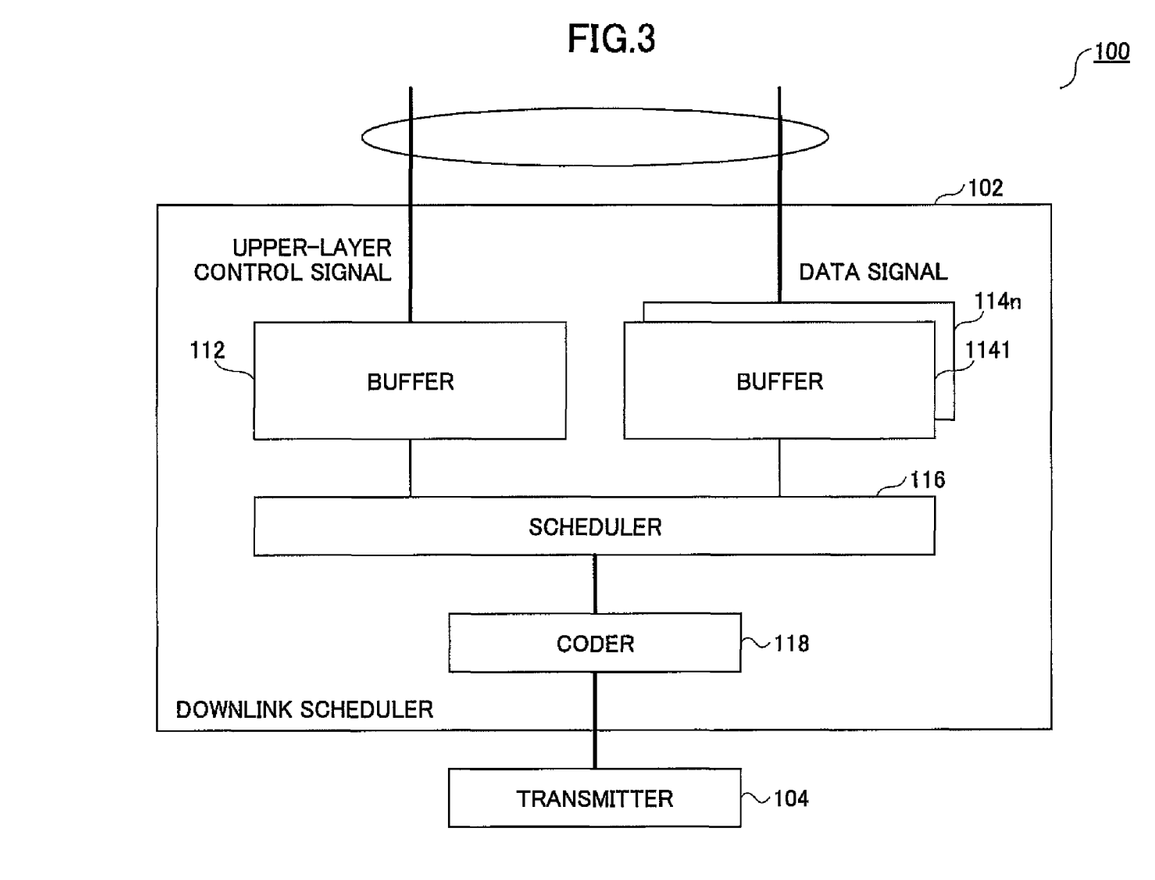
FIG. 3 illustrates a partial block diagram showing a base station according to an embodiment of the present invention.

Abase station 100 according to a first embodiment of the present invention is described with reference to FIG. 3.

In order to realize a network having a small delay, the base station 100 according to the embodiment has a high-speed data channel (below called Data CH) to which control signals are multiplexed. Moreover, the base station 100 uses this Data CH and provides absolute priorities in scheduling. This makes it possible to prevent a delay in scheduling.

The base station 100 has a downlink scheduler 102 and a transmitter 104 connected to the downlink scheduler 102, the transmitter 104 being means for determining transmission rate and means for transmitting. The downlink scheduler 102 has a buffer 112 to which an upper-layer control signal (a signal indicating, e.g., an authentication at the time of call setup, or a report on the reception state at the time of handover), and one or multiple buffers $114_1$ to $114_n$ (where n is an integer such that $n \geq 1$), to which data signals are input. Moreover, the downlink scheduler 102 includes a scheduler 116 connected to the buffer 112 and the buffers $114_1$ to $114_n$, and an encoder 118 connected to the scheduler 116. The encoder 118 is connected to the transmitter 104.

The buffer 112 temporarily stores an upper-layer control signal input. The buffers $114_1$ to $114_n$ temporarily store data signals input. The upper-layer control signal and the data signals are transmitted over the same physical cable.

Figure 4:
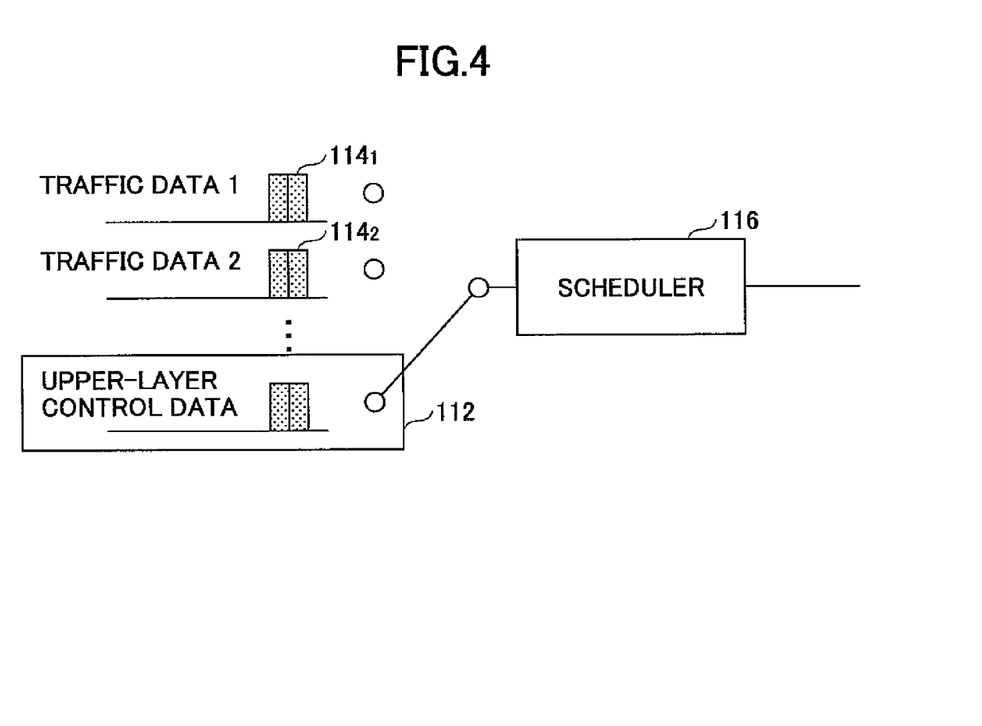
FIG. 4 illustrates an explanatory diagram showing an operation of a base station according to an embodiment of the present invention.

The scheduler 116 selects, from upper-layer control and data signals stored in the buffer 112 and buffers $114_1$ to $114_n$, a signal to be transmitted with priority, and inputs the selected signal to the encoder 118. For example, the scheduler 116 sets a priority order (priority) per buffer as illustrated in FIG. 4. In this case, the scheduler 116 sets information stored in the buffer 112 as a highest-priority queue such that any information incoming to this queue is transmitted unconditionally. In other words, the scheduler 116 preferentially inputs an upper-layer control signal in case of any upper-layer control signal being input to the buffer 112.

Figure 5:
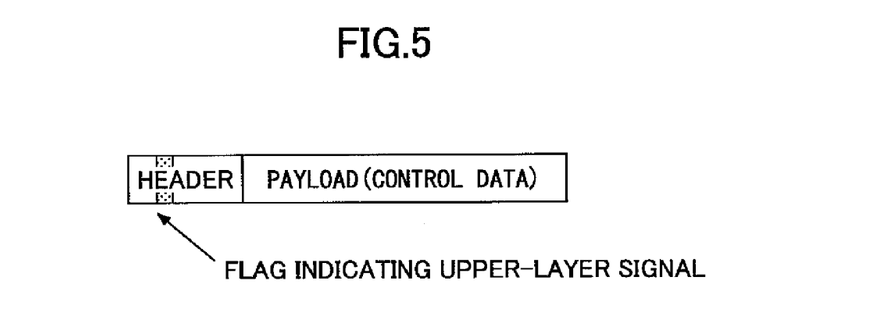
FIG. 5 illustrates an explanatory diagram showing an IP packet.

For example, as illustrated in FIG. 5, it is determined as to whether an IP packet is an upper-layer control signal by referring to a flag appended to its header, which flag indicating whether it is an upper-layer control signal. For example, an IP packet is provided with a predetermined field such that, according to the value of the field, it is stored in buffer 112 or buffers $114_1$ to $114_n$ depending on whether it is determined as an upper-layer control signal or a data signal. In this case, the field is set such that the IP packet is an upper-layer control signal when the value of the field is 0 and a data signal when the value of the field is 1, which field is referred to in order to determine whether it is an upper-layer control signal.

This feature makes it possible to store, in an IP packet, control information in addition to data, QoS information, and information indicating whether it is data to be given priority, and to transmit the IP packet.

The encoder 118 encodes a signal input and outputs the coded signal to the transmitter 104. The transmitter 104 modulates the coded signal, and transmits the modulated signal using a shared channel. For example, the transmitter 104 high-speed transmits the coded signal at the transmission rate of 10 Mbps, for example. For example, the shared channel is shared by multiple users with one slot taken up by at least one user. This makes it possible to significantly reduce the time to transmit a control signal.

While the embodiment describes a case of providing one buffer for temporarily storing an upper-layer control signal, multiple buffers may be provided for temporarily storing upper-layer control signals to multiple users. In this case, the scheduler 116 sets a priority for an upper-layer control signal, and outputs the upper-layer control signal to the encoder according to the priority set.

Moreover, in the embodiment, one buffer may be provided for temporarily storing an upper-layer control signal and a data signal. In this case, the scheduler 116 refers to an IP packet header, determines whether the IP packet is an upper-layer control signal, and inputs to the encoder 118 the IP packet based on the result of the determination.

Figure 6:
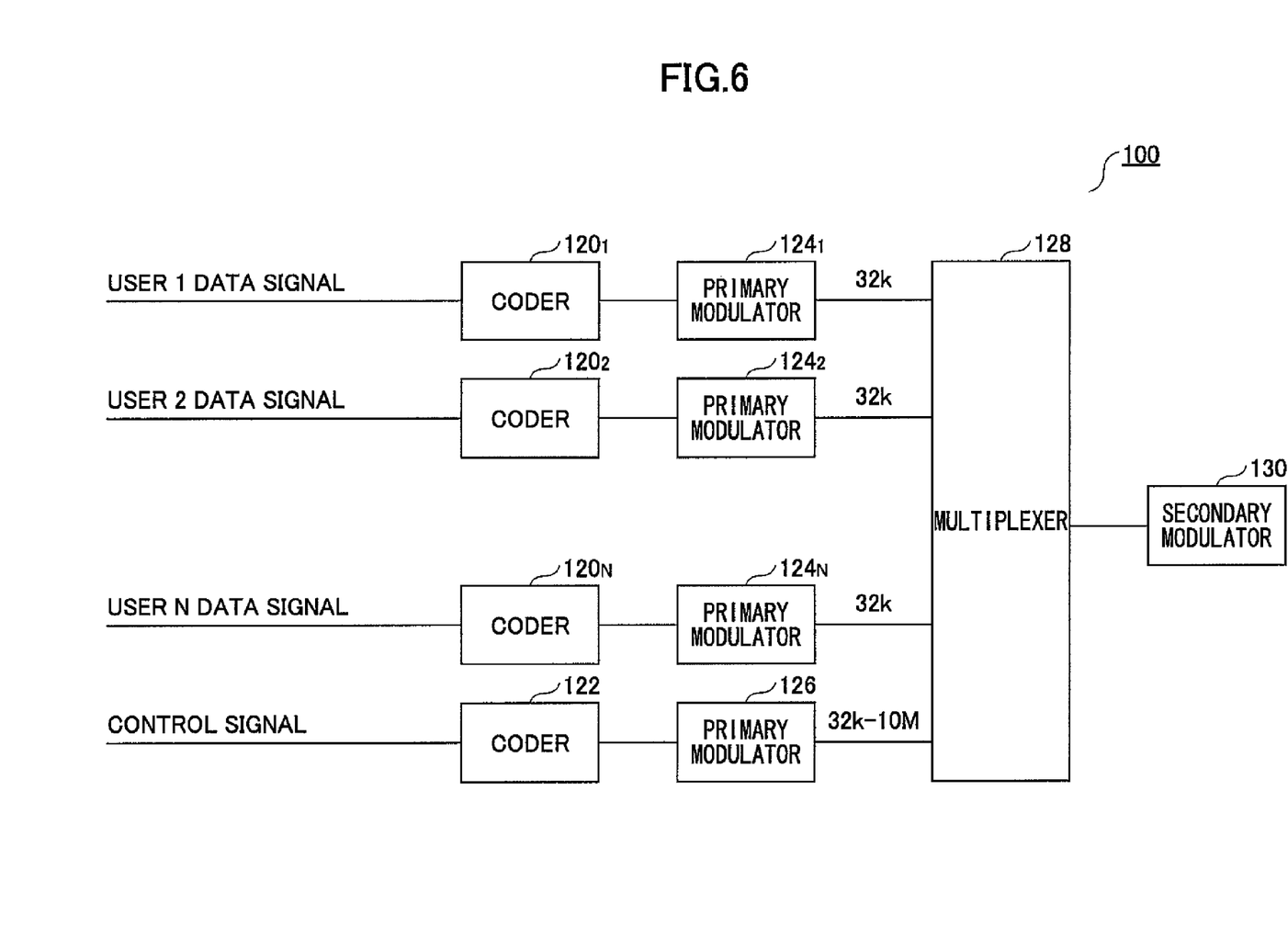
FIG. 6 illustrates a partial block diagram showing a base station according to an embodiment of the present invention.

Now a base station 100 according to a second embodiment of the present invention is described with reference to FIG. 6.

A base station 100 in the embodiment provides for a high-speed slot dedicated to a control channel in order to realize a network with a small delay. Each user control channel set as code-multiplexed is variably set according to information required.

The base station 100 includes encoders $120_1$-$120_N$, users 1-N data signals input to the respective encoders; an encoder 122 to which a control signal is input; primary modulators $124_1$-$124_N$ and 126 connected to the respective encoders $120_1$-$120_N$ and 122; a multiplexer 128 connected to the primary modulators $124_1$-$124_N$ and 126, the primary modulators being means for determining transmission rate and means for transmitting; and a secondary modulator 130 connected to the multiplexer 128.

The encoders $120_1$-$120_N$ code the input data signals and outputs the respective coded data signals to the respective primary modulators $124_1$-$124_N$. The primary modulators $124_1$-$124_N$ primary-modulate the coded signals input and output the primary-modulated signals to the multiplexer 128. Moreover, the encoder 122 codes an input control signal and outputs the coded signal to the primary modulator 126. The primary modulator 126 primary-modulates the coded signal input and outputs the primary-modulated signal to the multiplexer 128.

The multiplexer 128 allocates bandwidths to the primary-modulated data signals and control signal input, multiplexes the input signals, and outputs a multiplexed signal to the secondary multiplexer 130. For example, the multiplexer 128 allocates a 32 kHz bandwidth to each user data signal. Moreover, the multiplexer 128 variably allocates the bandwidth to be allocated to the control signal in the range of 32 kHz-10 MHz, for example. In this way, setting a Control CH for transmitting a control signal as a variable bandwidth signal makes it possible to control the transmission rate of a control channel for transmitting the control signal according to traffic conditions, or urgency (priority) of the control signal. In this case, the multiplexer 128, for example, controls the transmission rate to be approximately 500 kbps for an HO control signal, and approximately 1 Mbps for a call setup.

Figure 7:
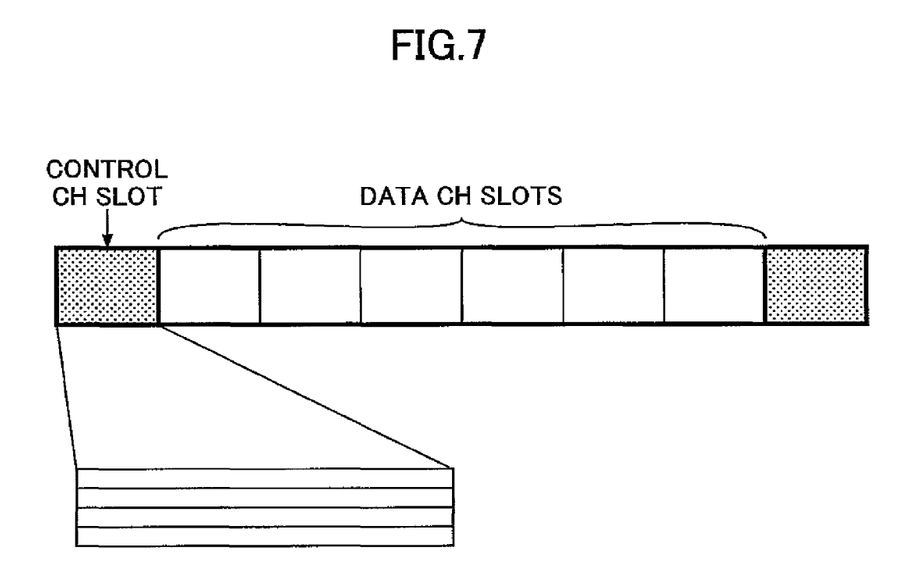
FIG. 7 illustrates an explanatory diagram showing an operation of a base station according to an embodiment of the present invention.

For example, multiplexer 128 time-multiplexes the primary-multiplexed data signals and control signal. As illustrated in FIG. 7, the multiplexer 128 allocates to multiple slots a control CH and data CHs. In this case, either code multiplexing or frequency multiplexing among users is performed within a slot to which a control CH is allocated (called a control CH slot).

Specifically, slots to which a control CH and data CHs are allocated are variably set. In this case, the base station 100 reports to the mobile station 200 the position of a slot to which a control CH is allocated.

Moreover, the multiplexer 128 may allocate the control CH and data CHs to multiple slots in a fixed manner. This makes it possible for the base station 100 to eliminate reporting to the mobile station 200 of the position of the slot to which the control CH is allocated.

Furthermore, the multiplexer 128 may allocate control CH and data CHs to multiple slots in a fixed manner, while variably allocating additional control CH and data CHs to slots. In this case, the base station 100 needs to report the position of a control CH slot to the mobile station 200.

Figure 8:
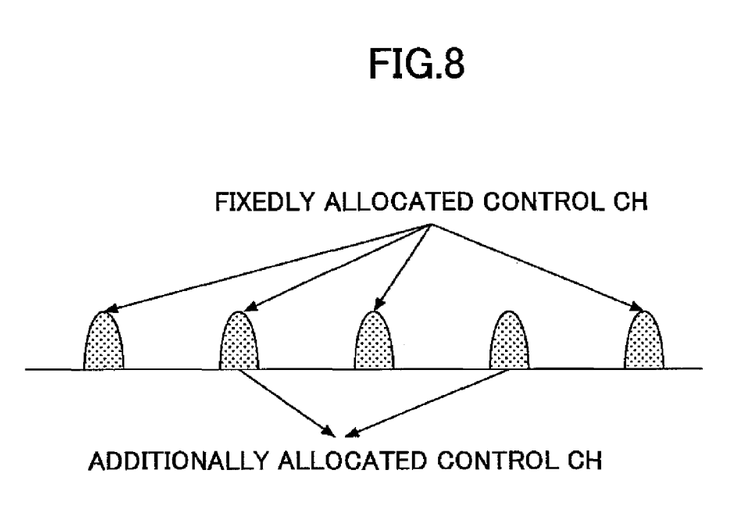
FIG. 8 illustrates another explanatory diagram showing an operation of a base station according to an embodiment of the present invention.

Moreover, the multiplexer 128 may, for example, frequency-multiplex the primary-multiplexed data signals and control signal. As illustrated in FIG. 8, the multiplexer 128 allocates to multiple sub-carriers control and data CHs. In this case, either code multiplexing or time multiplexing is performed among users within the sub-carrier to which a control CH is allocated.

Specifically, the multiplexer 128 sets, for the multiple sub-carriers, the sub-carriers to which control CHs are allocated as variable. In this case, the base station 100 reports the position of a control CH sub-carrier to the mobile station 200. The control CH sub-carrier takes a comb-shaped pattern in an uplink.

Moreover, the multiplexer 128 may make a fixed allocation of control CHs to sub-carriers. This makes it possible for the base station 100 to eliminate reporting to the mobile station 200 the position of a sub-carrier to which a control CH is allocated.

Furthermore, the multiplexer 128 may make a fixed allocation of control CHs to sub-carriers while variably allocating additional control CHs to sub-carriers. In this case, the base station 100 needs to report to the mobile station 200 the position of a sub-carrier to which a control CH is allocated.

Figure 9:
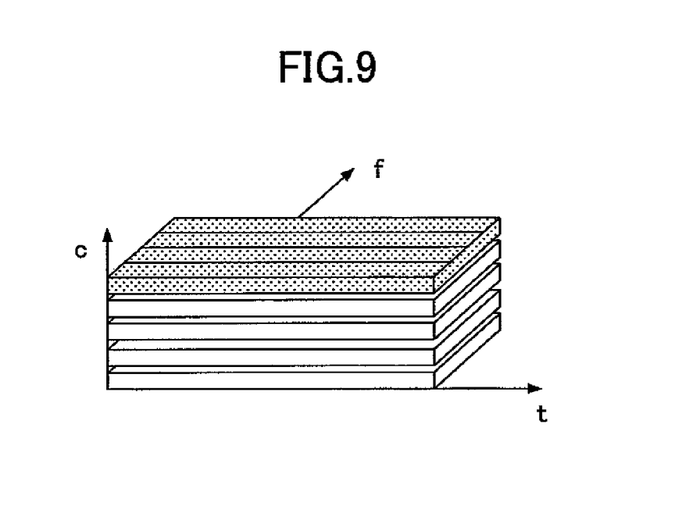
FIG. 9 illustrates a further explanatory diagram showing an operation of a base station according to an embodiment of the present invention.

Moreover, the multiplexer 128 may, for example, code-multiplex the primary-multiplexed data signals and control signal. The multiplexer 128, as illustrated in FIG. 9, allocates spread codes to a control CH and a data CH. In this case, either code multiplexing or time multiplexing among users using control CHs of the same spread code is performed.

Specifically, the multiplexer 128 variably sets spread code numbers and spreading rates for control CHs. In this case, the base station 100 reports to the mobile station 200 a spread code number allocated to a control CH.

Furthermore, the multiplexer 128 may fix the setting of some spread code numbers and spreading rates for control CHs while variably setting additional spread code numbers and spreading rates for control CHs. In this case, the base station 100 needs to report to the mobile station 200 a spread code number allocated to a control CH.

The secondary modulator 130 secondary-modulates the primary-modulated data and control signals multiplexed and transmits a secondary-modulated signal.

As described above, in the embodiment, the control CH itself is bandwidth-variable. For example, for 2 or 3 users, the users take up bandwidth for transmitting data signals with the remaining bandwidth allocated to control CHs. This makes it possible to control the transmission rate of the control signal.

Now transmission control of lower-layer control information is described. A lower-layer control signal represents information such as channel allocation information, ACK, and NACK.

In W-CDMA, for example, allocated channels and codes are designated by an upper-level station and not by a base station. However, in HSDPA, a base station does the designating. In HSDPA, a base station maps to a Physical CH a lower-level control signal, for example, channel allocation information, and transmits the mapped signal to the mobile station. In this case, not performing error detection would lead to the mobile station continuing to operate in error. Therefore, the base station appends to a lower-level control signal an error-detecting code according to its use.

Figure 10:
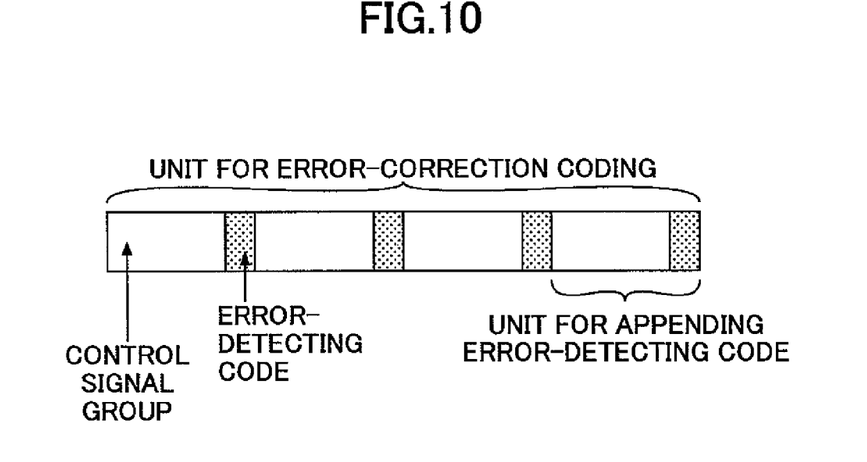
FIG. 10 illustrates an explanatory diagram showing an operation of a base station according to an embodiment of the present invention.

Specifically, as illustrated in FIG. 10, the encoder 122 appends error-detecting codes to the control signal according to use such as demodulating, decoding, and retransmitting. For example, error-detecting codes are appended to groups of control signals classified according to use. In this case, a unit for appending the error-detecting code (eg., length) may be set variable, or the error-detecting codes may be set as the same or different. Appending one error-detecting signal to a group rather than an individual one of lower-level control signals results in a larger number of bits to be error-detected, causing a larger probability of a detection error. Appending an error-detecting code individually according to use in this way makes it possible to improve the error-detecting accuracy.

Moreover, a unit for error-correction coding is one or more error-detecting codes. Furthermore, the error-detecting codes may be varied according to control-signal group bit groups. It is also possible to allow at least one error-correction coding block in one wireless frame.

Up to now, such control has not been done in a Physical CH. The feature of the embodiment as described above makes it possible to reduce negotiations from an upper-side or upper layer.

Now a mobile communication system according to a third embodiment of the present invention is described.

Methods of improving the transmission rate of the downlink for transmitting an upper-layer control signal have been described for the first and second embodiments.

In the embodiment, a method of improving the transmission rate for an uplink for transmitting an upper-layer control signal is described.

Figure 11:
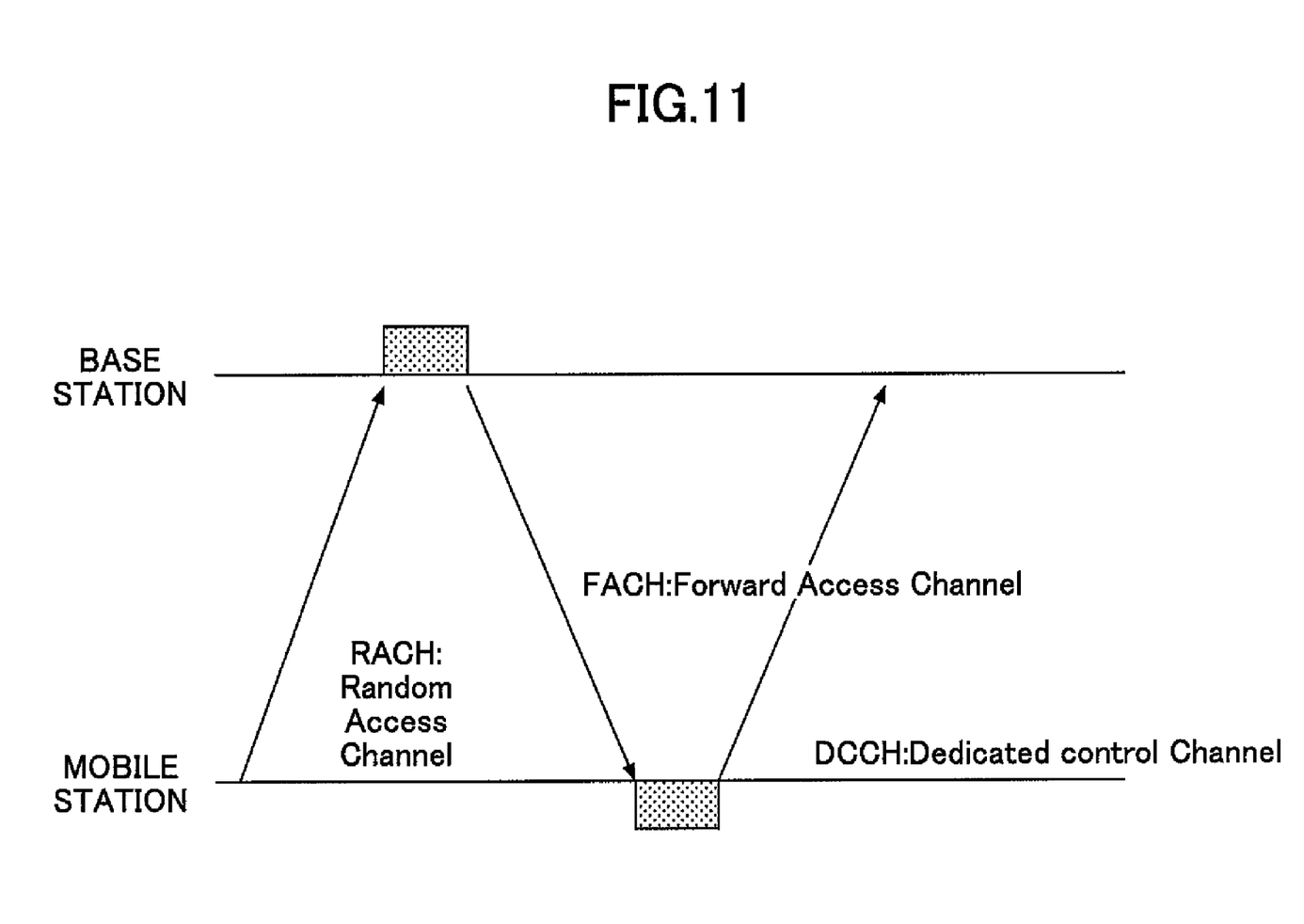
FIG. 11 illustrates a sequence diagram showing an operation of a mobile communication system.

First, a procedure for a mobile station transmitting to a base station an upper-layer signal is described with reference to FIG. 11.

A mobile station 200 transmits with a RACH (Random Access CHannel) to a base station 100 a control signal indicating a data transmission request. The base station 100 allocates codes to the mobile station 200 and transmits with a FACH a control signal indicating data communication permission. The mobile station 200 transmits with a DCCH (Dedicated Control CHannel) to the base station 100 an upper-layer signal in codes allocated.

In this case, however, a low rate of the DCCH leads to a longer time for transmitting an upper-layer control signal from the mobile station 200 to the base station 100. Thus, in a mobile communication system according to the embodiment, the mobile station 200 uses a UL-SCH (Uplink Shared Channel) to transmit to a base station 100 an upper-layer control signal.

Figure 12:
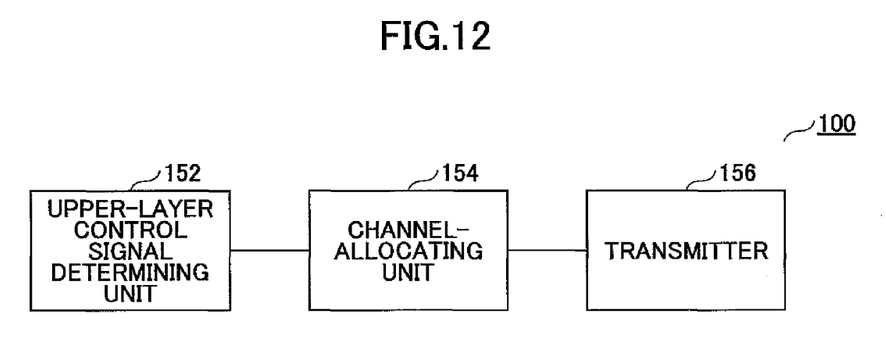
FIG. 12 illustrates a partial block diagram showing a base station according to an embodiment of the present invention.

A base station 100 according to the embodiment of the present invention is described with reference to FIG. 12.

The base station 100 according to the present invention includes an upper-layer control signal determining unit 152, a channel-allocating unit 154 connected to the upper-layer control signal determining unit 152, and a transmitter 156 connected to the channel-allocating unit 154, the transmitter 156 being reporting means.

The upper-layer control signal determining unit 152 determines whether a below-described control signal transmitted from the mobile station 200 with a Reservation control CH is a signal indicating transmitting an upper-layer control signal.

For example, the upper-layer control signal determining unit 152 refers to a predetermined flag in a transmitted IP packet to determine whether the flag indicates transmitting an upper-layer control signal. For example, a predetermined field is provided for in an IP packet that allows determining, according to the value of the field, whether transmitting an upper-layer control signal is indicated therein.

The channel-allocating unit 154 allocates an upper UL-SCH when a control signal transmitted from the mobile station 200 with the Reservation control CH indicates transmitting an upper-layer control signal. In this case, the channel-allocating unit 154 allocates a UL-SCH according to the amount of information.

The transmitter 156 makes a report (an allocation report) to the mobile station 200 which has transmitted the Reservation control CH, indicating that a UL-SCH has been allocated. For example, a user ID and a MCS (Modulation & Coding scheme Set) are stored in a packet indicating an allocation report. Instruction information indicating which multiplexing scheme to transmit with is stored in the MCS.

Figure 13:
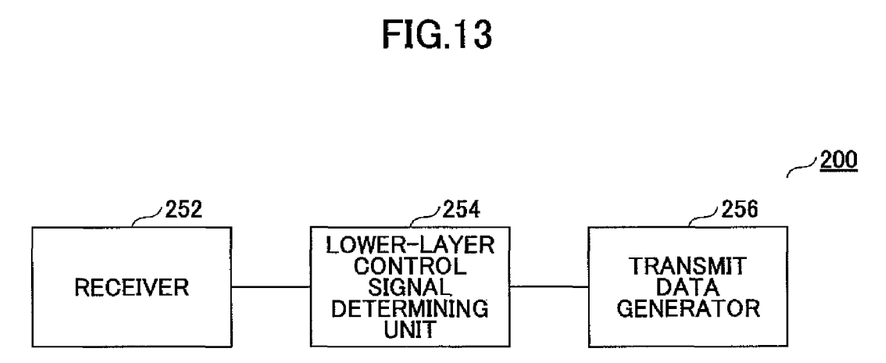
FIG. 13 illustrates a partial block diagram showing a mobile station according to an embodiment of the present invention.

Now a mobile station 200 according to the embodiment of the present invention is described with reference to FIG. 13.

The mobile station 200 according to the embodiment includes a receiver 252, a lower-layer control signal determining unit 254 connected to the receiver 252, and a transmit data generator 256 connected to the lower-layer control signal determining unit 254, the transmit data generator 256 serving as means for generating a control signal and means for transmitting an upper-layer control signal.

The receiver 252 receives an allocation report from the base station 100, and inputs the received report to the lower-layer control signal determining unit 254.

The lower-layer control signal determining unit 254 determines as to whether a user ID stored in the input allocation report matches an ID of the mobile station 200 itself, and, if yes, instructs the transmit data generator 256 to generate transmit data.

The transmit data generator 256 generates a control signal indicating transmitting an upper-layer control signal and transmits the generated signal. For example, the transmit data generator 256 transmits with a Reserved control CH an IP packet with a flag indicating transmitting an upper-layer control signal. Moreover, the transmit data generator 256 refers to MCS information stored in the allocation report to transmit the upper-layer control signal.

Figure 14:
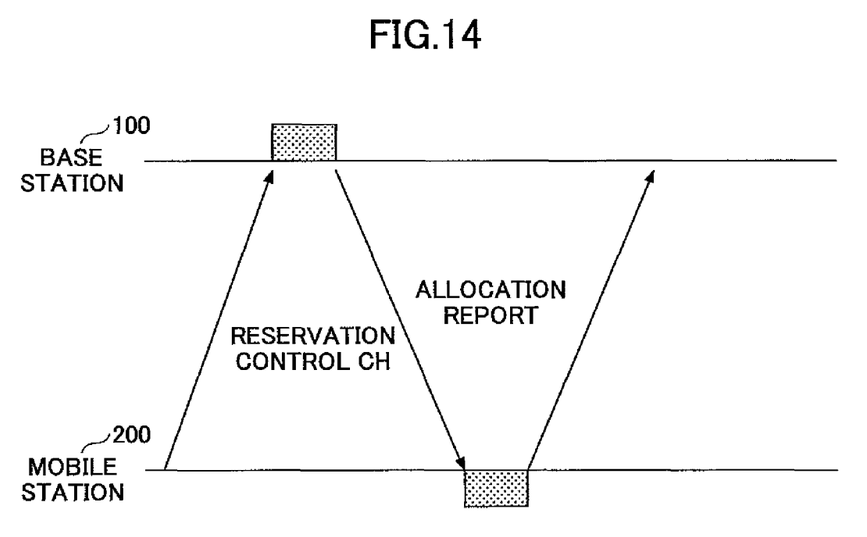
FIG. 14 illustrates a sequence diagram showing an operation of a mobile communication system according to one embodiment of the present invention.

Now a mobile communication system according to the embodiment of the present invention is described with reference to FIG. 14.

First, the transmit data generator 256 of the mobile station 200 transmits with the Reservation control CH to the base station 100 a control signal indicating transmitting an upper-layer control signal.

The base station 100 in the upper-layer control signal determining unit 152 determines whether the received control signal is a control signal indicating transmitting an upper-layer control signal. If yes, the channel-allocating unit 154 preferentially allocates an uplink UL-SCH to the mobile station 200. Then, the transmitter 156 makes a report (allocation report) that the uplink UL-SCH has been allocated to the mobile station 200. In this case, the channel-allocating unit 154 allocates according to the amount of information.

Upon receiving the allocation report, the receiver 252 in the mobile station 200 inputs the allocation report to the lower-layer control signal determining unit 254. The lower-layer control signal determining unit 254 determines whether an ID stored in the allocation report input matches an ID of the mobile station 200. If yes, the transmit data generator 256 transmits with a UL-SCH an upper-layer control signal according to an MCS stored in the allocation report.

This makes it possible for the mobile station 200 to use the UL-SCH to transmit an upper-layer control signal using approximately 1 MHz bandwidth. Moreover, setting the base station 100 to allocate a bandwidth to an upper-layer control signal according to the amount of information makes it possible to reduce the transmission power expended by the mobile station 200.

In circuit switching, a circuit is set up during a communication, while not being able to stop for other communications. In packet transmission, communications in voice, also in packets, can be stopped temporarily, eg., for approximately 20-50 ms. Thus, it is possible to transmit a control signal.

Figure 15:
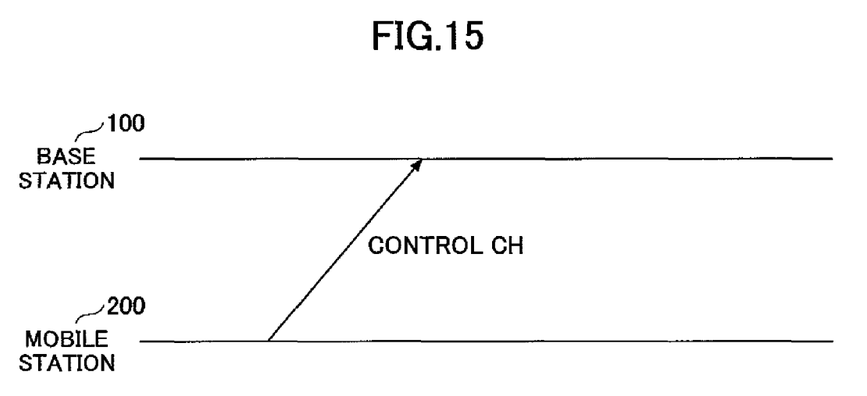
FIG. 15 illustrates another sequence diagram showing an operation of a mobile communication system according to one embodiment of the present invention.

In the present embodiment, a case has been described such that the mobile station 200 transmits an upper-layer control channel after a Reservation control CH transmission and a UL-SCH allocation. However, as illustrated in FIG. 15, a traffic-state reporting unit for measuring the traffic state and reporting the result to the mobile station 200 may be provided in the base station 100 with an upper-layer control signal transmitted by the mobile station 200 based on the reported traffic state. In this case, the mobile station 200 directly transmits a high-speed control channel in a high-speed generator 256 without undergoing a reservation procedure.

In the above-described embodiments, control signal transmitting has been described in a manner such that it is divided into downlink and uplink. Specifically, downlink has been described for the downlink scheduler and multiplexer 128 in the first and second embodiments, while uplink has been described for the upper-layer control signal determining unit 152 and the channel-allocating unit 154 in the third embodiment. An actual base station may be provided with a downlink scheduler, a multiplexer 128, an upper-layer control signal determining unit 152, and a channel-allocating unit 154.

The present application claims priority based on Japanese Patent Application No. 2005-102872 filed on Mar. 31, 2005 with the Japanese Patent Office, the entire contents of which are hereby incorporated by reference.

The base station, mobile station, mobile communication system, and a method of controlling control signal transmission according to the present invention is applicable to a mobile communication system.

The invention claimed is:

1. A base station, comprising:
   a transmission-rate determining unit for determining a transmission rate of a control channel for transmitting an upper-layer control signal;
   a transmitter for, based on a predetermined transmission rate, allocating a predetermined bandwidth to the control channel for transmitting the upper-layer control signal, wherein the control channel is set as a variable bandwidth, and transmitting the signal; and
   a scheduler for determining a transmission order of the upper-layer control signal and one or a plurality of data signals,
   wherein the transmitter transmits the upper-layer control signal and the data signals according to the transmission order,
   wherein the transmission rate of the control channel for transmitting the control signal is determined according to a priority of the control signal, and
   wherein the scheduler uses a flag appended to an IP packet to determine whether the IP packet includes the upper-layer control signal.

2. The base station as claimed in claim 1, wherein the scheduler provides a highest-priority transmission order to the upper-layer control signal.

3. The base station as claimed in claim 1, wherein the transmitter allocates to the control channel transmitting the upper-layer control signal a bandwidth, the bandwidth being what remains after one or a plurality of bandwidths are taken up for transmitting one or a plurality of data signals.

4. A method of controlling control signal transmission, comprising the steps of:
   determining a transmission rate of a control channel for transmitting an upper-layer control signal;
   according to the determined transmission rate, allocating a predetermined bandwidth to a control channel for transmitting the upper-layer control signal, wherein the control channel is set as a variable bandwidth;
   determining a transmission order of the upper-layer control signal and one or a plurality of data signals; and
   transmitting the upper-layer control signal to which the determined bandwidth is allocated,
   wherein the transmission rate of the control channel for transmitting the control signal is determined according to a priority of the control signal,
   wherein a transmitter transmits the upper-layer control signal and the data signals according to the transmission order, and
   wherein a scheduler uses a flag appended to an IP packet to determine whether the IP packet includes the upper-layer control signal.

5. The method as claimed in claim 4, further comprising the step of
   determining a transmission order of the upper layer control signal and one or a plurality of data signals; wherein
   the transmitting step includes transmitting the upper-layer control signal and the data signals according to the transmission order.

* * * * *